(12) United States Patent
Marsden et al.

(10) Patent No.: US 6,767,569 B1
(45) Date of Patent: Jul. 27, 2004

(54) SURFACE DECONTAMINATION OF COOKED SAUSAGE AND PROCESSED MEAT AND POULTRY PRODUCTS

(75) Inventors: James L. Marsden, Manhattan, KS (US); Eric W. Krieger, Mentor, OH (US); Lewis I. Schwartz, Shaker Heights, OH (US); Alan J. Greszler, Elyria, OH (US); Bill R. Sanford, Willoughby, OH (US)

(73) Assignee: Steris Inc., Temecula, CA (US)

( * ) Notice: Subject to any disclaimer, the term of this patent is extended or adjusted under 35 U.S.C. 154(b) by 410 days.

(21) Appl. No.: 09/616,516

(22) Filed: Jul. 14, 2000

Related U.S. Application Data

(60) Provisional application No. 60/143,892, filed on Jul. 14, 1999.

(51) Int. Cl.[7] ............................. A23B 4/12; A23B 4/20; A23L 1/317
(52) U.S. Cl. ....................... 426/326; 426/332; 426/335
(58) Field of Search ................................ 426/324, 326, 426/332, 335, 652

(56) References Cited

U.S. PATENT DOCUMENTS

| | | | |
|---|---|---|---|
| 2,512,640 A | 6/1950 | Greenspan et al. | |
| 4,810,508 A | 3/1989 | Dell'Acqua et al. | |
| 5,043,174 A | 8/1991 | Lindner | |
| 5,173,319 A | 12/1992 | Boudreaux et al. | |
| 5,219,603 A | 6/1993 | Boudreaux et al. | |
| 5,573,801 A | 11/1996 | Wilhoit | |
| 5,855,940 A | 1/1999 | Compadre et al. | |
| 6,183,807 B1 * | 2/2001 | Gutzmann et al. | 426/332.25 |
| 6,387,238 B1 * | 5/2002 | Merk et al. | 426/332.25 |

FOREIGN PATENT DOCUMENTS

| | | |
|---|---|---|
| GB | 947688 | 1/1964 |
| GB | 1570492 | 7/1980 |
| WO | WO 95/04126 | 2/1995 |
| WO | WO 95/10191 | 4/1995 |

* cited by examiner

Primary Examiner—Arthur L. Corbin
(74) Attorney, Agent, or Firm—Fay, Sharpe, Fagan, Minnich & McKee, LLP

(57) ABSTRACT

Cooked food products, such as cooked meats, and poultry, are treated with a decontaminant solution to remove surface microorganism contamination. The decontaminant solution contains peracetic acid at a concentration of from about 100 to 4000 ppm and has broad spectrum activity against a variety of pathogenic and spoilage microorganisms, such as *Listeria monocytogenes*.

10 Claims, 3 Drawing Sheets

SURFACE DECONTAMINATION OF COOKED SAUSAGE AND PROCESSED MEAT AND POULTRY PRODUCTS

This application claims the priority of U.S. Provisional Application Serial No. 60/143,892, filed Jul. 14, 1999.

BACKGROUND OF THE INVENTION

The present invention relates to the food processing arts. It finds particular application in conjunction with the post-pasteurization, surface microbial decontamination of hot dogs, sausages, and other processed meat and poultry products prior to packaging, and will be described with particular reference thereto. It should be appreciated, however, that the invention is also applicable to the treatment of raw meat and poultry and other food products subject to microbial contamination.

Prevention of food poisoning is of paramount importance in the food processing industry. Concern for food safety has lead most countries to regulate the food industry heavily to minimize public health risks. Despite these efforts, food poisoning still occurs. Many instances of food poisoning are attributed to bacteria, such as Salmonella, Clostridium, and Staphylococcus, among others.

Of rising concern is the relatively recent increase in the Listeria contamination of poultry and processed food products, such as frankfurters, other sausages, cheese, dairy food, and seafood. Processed meat and poultry products such as frankfurters are generally cooked to destroy harmful bacteria of particular concern is the discovery that pasteurized and fully cooked processed foods are being contaminated with microbes, such as *Listeria monocytogenes,* following cooking or pasteurization and prior to packaging for point of sale. Such contamination is typically surface contamination and is believed to be caused by the contact of microbes with food surfaces subsequent to heat treatment. Microbes such as Listeria may be airborne (i.e. carried by dust) or present on food contacting surfaces, such as processing equipment.

Recently, several outbreaks of food poisoning have been reported in which the causative agent was suspected to be or identified as Listeria contaminated food. Listeriosis is a serious disease which may cause meningitis, spontaneous abortion, and perinatal septicaemia. Although treatable with early diagnosis, untreated Listeriosis exhibits a high mortality rate. In 1998, 20 deaths were associated with a Listeria epidemic. Regulations now specify that food should be absolutely free of Listeria, any contamination is. considered to be an adulteration and the food should not be placed in commerce.

Food preservation by inhibition of growth of *Listeria monocytogenes* is difficult. Listeria is a particularly difficult microorganism to destroy because it is heat resistant and is able to grow even under refrigeration in raw and cooked products. Methods for destroying the organism on raw and on processed foods have included treatments using heat, radiation, chemicals, or antibiotics.

In the heat and irradiation treatments, the food products are subjected to the heat or radiation after packaging. However, the heat resistance of the organism makes it difficult to achieve complete kill through heat.

Antibiotics, such as Streptococcus lactis-derived or synthetic equivalent bacteriocin, such as nisin, have been used, either as a spray, or dip, or as a film on the packaging or casing which remains in contact with the food during heat treatment.

Chemicals used in treating the food products include ammonium compounds and acids such as citric, lactic and acetic acid, which have been used to wash down meat carcasses. With the chemical treatment methods, the carcass is placed on a conveyer system and the decontaminating chemical is sprayed over the items as they pass beneath. Liquid smoke has been used on pasteurized processed foods to inhibit recontamination after cooking. However, this imparts an undesirable, phenolic taste when used post-pasteurization.

If chemicals are to be used post-pasteurization, it is desirable that they are both effective antimicrobial agents and non-hazardous to consumers if they remain on the food product. Acids such as citric, lactic and acetic acids, while being safe for consumers, are not always completely effective at inactivating the microorganism. Even if one or two microorganisms remain on the food product, these can grow and multiply under refrigeration to a level to which they are toxic to the consumer by the time the product is sold.

The present invention provides for a new and improved apparatus and method for treating food products which overcomes the above-referenced problems and others.

SUMMARY OF THE INVENTION

In accordance with one aspect of the present invention, a method of treating a food product is provided. The method includes contacting an exterior of the food product with a decontaminant solution containing an antimicrobial agent, which includes peracetic acid, for a sufficient time to microbially decontaminate the exterior of the food product.

In accordance with another aspect of the present invention, a method of treating a food product is provided. The method includes spraying the food product with a solution comprising peracetic acid in a first chamber and drying the food product in a second chamber.

In accordance with another aspect of the present invention, an apparatus for treatment of a food product is provided. The apparatus includes first and second chambers. Spray nozzles are disposed in the first chamber for spraying a decontaminant solution over the food product. The decontaminant solution includes peracetic acid. A pump is fluidly connected with a source of the decontaminant solution and the nozzles for supplying pressurized decontaminant solution to the nozzles. A source of a drying gas is connected with the second chamber for drying the decontaminated food product. A conveyor system conveys the food product through the first and second chambers.

One advantage of the present invention is that pathogenic bacteria, such as Listeria, *E. coli,* and Salmonella are destroyed in a short period of time.

Another advantage of the present invention is that the peracetic acid used to decontaminate the food products naturally degrades to non-harmful reaction products, such as acetic acid and water, over a short period of time.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps The drawings are only for purposes of illustrating a preferred embodiment and are not to be construed as limiting the invention.

DETAILED DESCRIPTION OF THE PREFERRED EMBODIMENTS

A decontaminant solution containing peracetic acid has broad spectrum antimicrobial activity for treatment of exposed surfaces of processed foods and raw meats and poultry. While particular reference is made to the reduction in the species *Listeria monocytogenes* on cooked sausages, such as frankfurters, it should be appreciated that the decontaminant solution is also effective for the reduction in other pathogenic and spoilage microorganisms, such as *Aeromonas hydrophila, Aerobacter butzleri, Bacillus cereus, Campylobacter jejuni, Eschericia coli, Salmonella typhimurium, Staphylococcus aureus*, and others on a variety of processed foods and. raw meats and poultry. The term udecontaminateff and similar terms are used herein to encompass all forms of surface microbial decontamination, including disinfection and sterilization.

Figure 1:
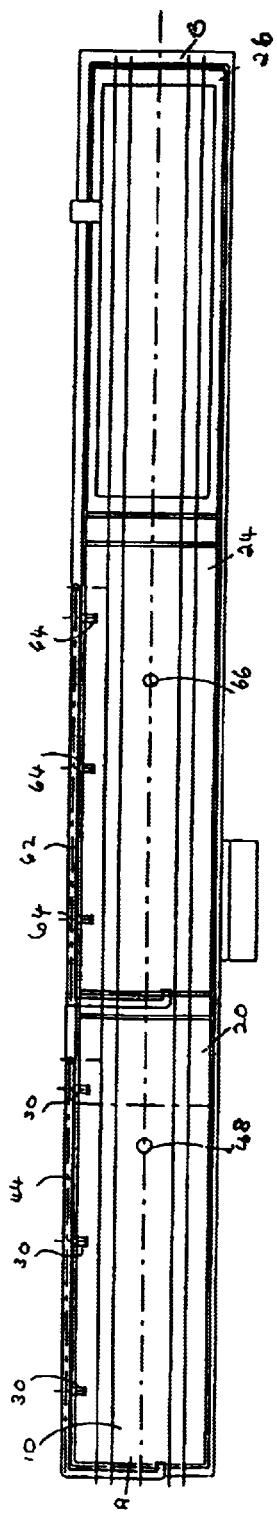
FIG. 1 is a schematic top view of a food treatment system according to the present invention.
Figure 2:
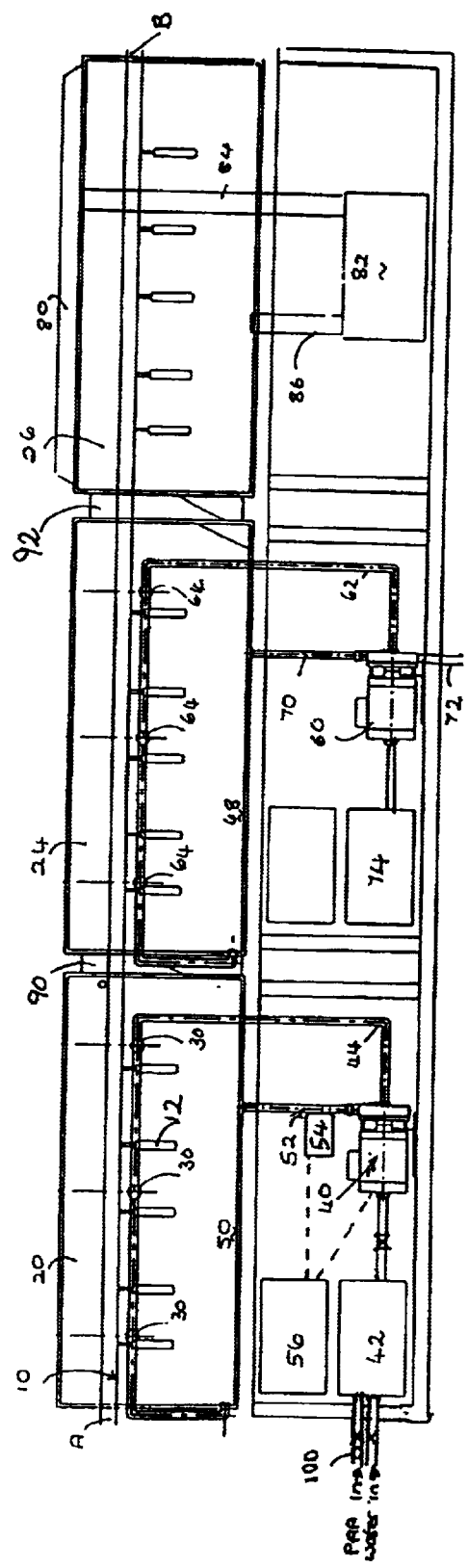
FIG. 2 is a schematic side sectional view of the food treatment system of FIG. 1.
Figure 3:
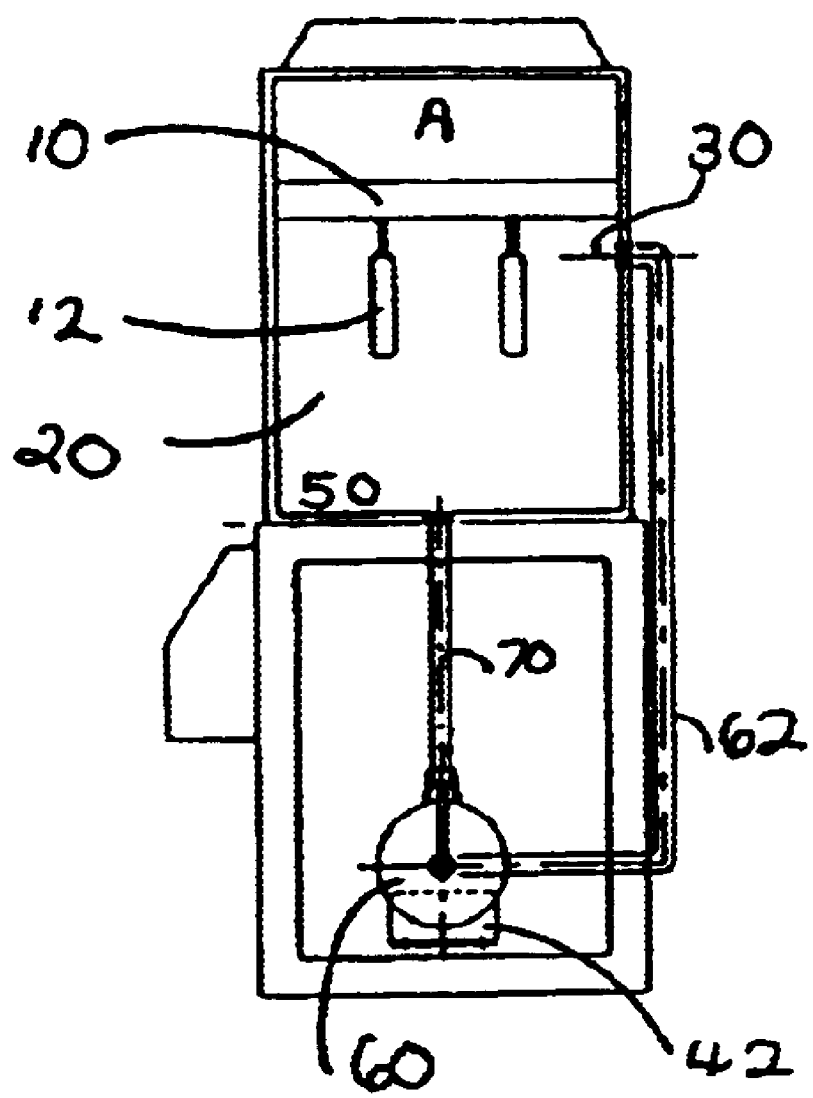
FIG. 3 is a schematic front view of the food treatment system of FIG. 1.

With reference to FIGS. 1–3, a system for treatment of food products to remove surface contamination of microorganisms, such as Listeria, includes a conveyor system 10, such as a moving conveyor belt. Food products to be treated 12, such as precooked meats, sausages, or other processed foods, raw meat, poultry, fish, whole carcasses, or dairy products are loaded onto the conveyor belt at position A. In the case of sausages, such as frankfurters, these are preferably removed from their casing by peeling or other method prior to loading onto the conveyor system. The peeled frankfurters pass from the peeler to an orienting machine (not shown) which loads: them on to the conveyor such that they are oriented perpendicularly to the direction of travel. While FIGS. 1–3 show the food products hanging from the conveyor on hooks 14, it is also contemplated that the food products be laid on a perforated conveyor belt 10 and rotated during conveyance.

The conveyor system 10 carries the food products into a first chamber or enclosure 20, where the food products are sprayed with the decontaminant solution. Preferably, the conveyor system then carries the sprayed food products into a second chamber or enclosure 24 where a rinse fluid is sprayed over the food products. Finally, the food products are carried by the conveyor into a third chamber or enclosure 26 where sterile air is blown over the products to dry them. The food products are aseptically removed from the conveyor at point B and packaged in sterile packaging for shipment.

Multiple spray nozzles 30 in the first chamber 20 spray the decontaminant solution over the food products. The spray nozzles are preferably arranged so that all surfaces of the food products are contacted with the decontaminant solution. The spray nozzles may be arranged at the sides, above, and or below the processed food passing by. Alternatively, or additionally, the conveyor system 10 rotates the food products as they pass by the nozzles 30 so that all surfaces are contacted.

A pump 40 pumps,the decontaminant solution from a reservoir 42 to the spray nozzles through a supply line 44. Sprayed decontaminant solution drips through openings 48 in the conveyor system and collects in a sump 50 at the base of the chamber 20. Preferably, the pump withdraws the collected decontaminant solution from the sump through a return line 52 and recycles it through the spray nozzles 30.

Periodically, the decontaminant solution is replaced or replenished with fresh decontaminant solution from the reservoir 42 and the used decontaminant is carried to a drain or otherwise disposed. Additionally, or alternatively, a sensor 54 detects the peracetic acid concentration of the circulating decontaminant solution. A controller 56 receives signals from the sensor. When the peracetic acid concentration drops below a predetermined level, the controller causes additional peracetic acid to be supplied from the reservoir 42 to raise the peracetic acid concentration in the decontaminant solution flowing to the nozzles.

The second chamber 24 is similar to the first chamber except in that a rinse fluid is sprayed over the food products in place of the decontaminant solution to remove substantially all of the peracetic acid from the food products. Specifically, a second pump 60 pumps the rinse fluid through a supply line 62 to nozzles 64 in the second chamber. The sprayed rinse fluid passes through apertures 66 in the conveyor system and collects in a sump 68 at the bottom of the second chamber. The sprayed rinse fluid is returned to the pump by a return line 70. Alternatively, the return line directs the sprayed rinse fluid directly to a drain 72.

Preferably, the rinse fluid comprises sterile water which is free of all harmful microorganisms. A source of sterile water 74, such as a sterile water generator, preferably receives tap water and destroys harmful bacteria in the water. The sterile water is then pumped from the source 74 to the supply line 62 by the pump 60.

In the third chamber 26, an air manifold 80 blows sterile air over the food products to dry them. The air is generated by an air dryer 82 which passes the dry air to the manifold via a forced air inlet line 84. Air is returned from the chamber to the air dryer though an air return line 86 where it is dried and sterilized, such as by heating, and then cooled to an appropriate temperature prior to returning the air to the manifold 82.

The three chambers are aseptically connected with each other by conduits 90, 92 such that microorganisms are inhibited from recontaminating the food between the three stages. While 3 separate chambers are shown, it is also contemplated that the decontaminating and rinsing steps may be carried out in a single chamber, with the rinse nozzles 64 spaced a suitable distance from the decontaminant spray nozzles 30 so that there is little or no interference between the respective spray jets. While the air drying step may also be performed in the same chamber as the decontaminant and rinsing steps, it is preferable to perform this step in a separate chamber, where humidity can be reduced.

Optionally, the rinse step and rinse chamber are eliminated. The peracetic acid in the decontaminant solution rapidly degrades over a period of a few hours to non-harmful products, such as acetic acid and water, and thus traces of the decontaminant solution on the food products are not harmful to consumers. Acetic acid (vinegar) is a common additive in many food products and is not harmful. Leaving a portion of the decontaminant solution on the food products ensures that they remain microbially decontaminated until packaging. The decontaminant solution also helps to keep the interior of the package sterile during packaging. Any remaining peracetic acid in the package degrades to harmless products by the time packaged food products reach the store shelves or the ultimate consumer.

It should be appreciated that the decontaminant solution is also suited to other methods of treatment of food products, such as dipping or immersing in the solution.

The decontaminant solution preferably contains from about 500 to about 4,000 ppm of peracetic acid. The optimal concentration depends an the length of time to which the food products are exposed to the decontaminant solution and on the temperature of the decontaminant solution. For example, a six log reduction (a reduction in the number of microorganism of a factor of $10^6$) can be achieved by contacting the surfaces of the food product with a 1,000 ppm peracetic acid solution for 12 seconds at 8° C. For ensuring complete elimination of resistant microorganisms, such as Listeria, longer times and/or higher peracetic acid concentrations are preferred. Preferred peracetic acid concentrations are from about 1000 to about 2,000 ppm for contact times of 30 seconds to 1 minute to ensure complete kill of Listeria and other undesirable microorganisms at temperatures of from about 8–20° C. Microbiological analysis procedures are carried out periodically on samples of the treated frankfurters to ensure that the conditions used are maintaining a 100% kill of Listeria or other selected microorganisms.

Tests with a variety of microorganisms have shown that the peracetic acid decontaminant solution has broad spectrum activity against a wide variety of pathogenic and spoilage microorganisms Minimum inhibitory concentrations can be readily established for any specific microorganism or microorganisms to be destroyed.

The decontaminant solution may also contain other components, such as buffers, surfactants, chelating or sequestering agents, and the like, provided that these are non-toxic (i.e., specified as "food grade") or are rinsed thoroughly from the food products prior to packaging.

The peracetic acid for the decontaminant solution may be diluted from a concentrate, such as a 30–38% peracetic acid in water concentrate. In one preferred embodiment, the concentrated peracetic acid is metered into the reservoir using a metering device, such as a metering pump 100. Or, the concentrated peracetic acid is provided as a measured dose. For example, a measured dose of the liquid concentrate is contained in a cup. The cup is opened, when needed, to release the contents into a dilution liquid, such as water. Optionally, the cup contains two or more compartments, with the liquid concentrate contained in one compartment and one or more of the other components of the decontaminant solution, such as buffers, surfactants, corrosion inhibitors, etc., contained in a separate compartment or compartments. The compartments are opened when the decontaminant solution is to be used, either by the user, or by an automated opening device.

In an alternate embodiment, the decontaminant solution may be formed by reaction of two or more reagents which form the peracetic acid in water. For example, an acetyl donor, such as acetyl salicylic acid, and a persalt such as a perborate are mixed in water, where they react to form the peracetic acid In one embodiment, acetyl salicylic acid and sodium metaborate are separately contained in a two compartment cup, optionally together with other dry components of the decontaminant solution. The cup is opened and the contents of the two compartments are mixed with a known quantity of water in the reservoir 42 to form the decontaminant solution.

In yet another alternate embodiment, peracetic acid is generated electrolytically and supplied to reservoir 42.

The water for the decontaminant solution may be tap water or treated water, such as distilled, filtered or sterile water. Optionally, all or part of the water may be replaced by other solvents.

The terms "chelating agents" and "sequestering agents" are used synonymously herein to encompass inorganic and organic compounds capable of forming coordinating complexes with metals. Suitable chelating agents include, but are not limited to, ethylene diaminetetraacetic acid and its salts, cyclodextrins, hydrocarboxylic acids, such as citric acid, acetic acid, lactic acid, tartaric acid, and their salts, alone or in combination.

The decontaminant solution may also contain other antimicrobial decontaminants, such as hydrogen peroxide, citric acid, lactic acid, or acetic acid, alone, or in combination.

A preferred pH for microbial decontamination by the peracetic acid is around neutral. Accordingly, the pH of the decontaminant solution is preferably adjusted or buffered to a pH of between about 6.5 and about 7.5. Phosphate buffer systems, which are acceptable in food processing, are suitable buffers.

Figure 4:
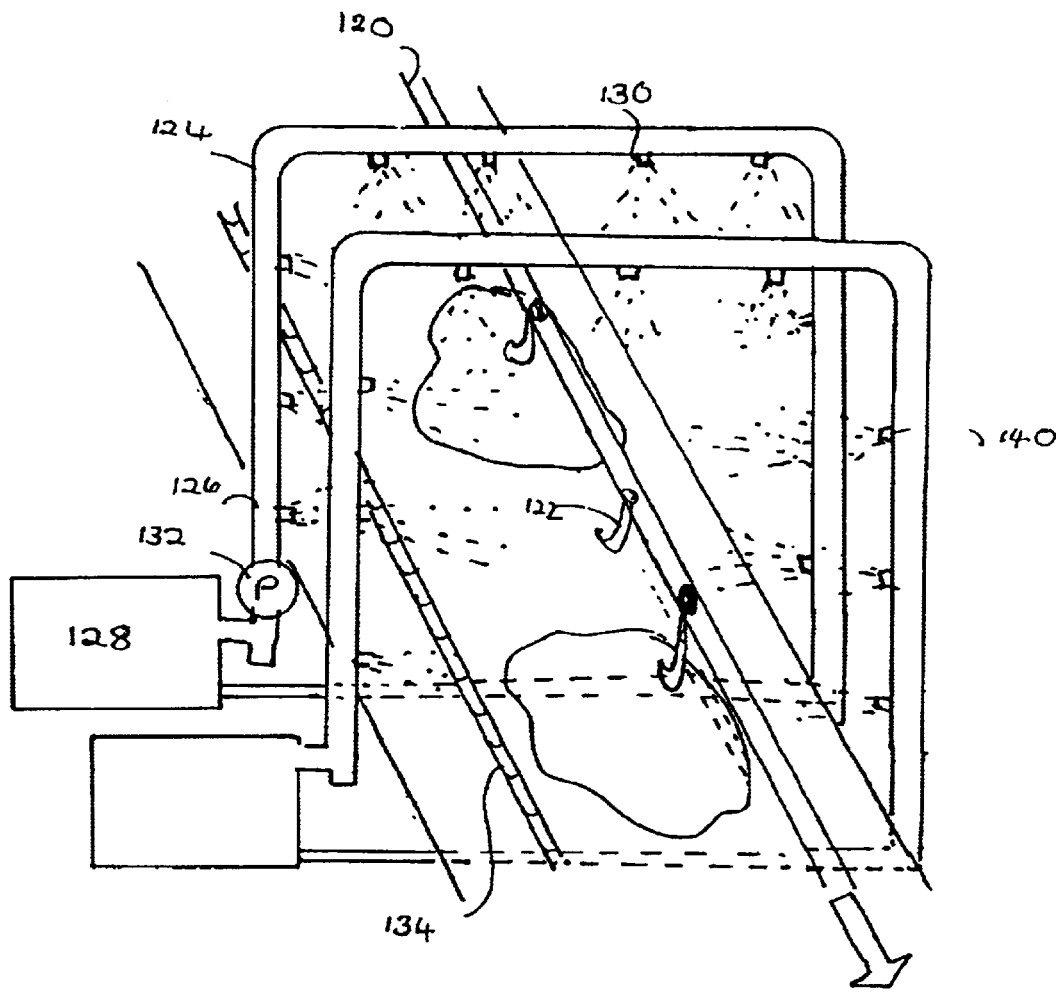
FIG. 4 is a perspective view of a system for treatment of carcasses.

With reference to FIG. 4, an alternative embodiment of the apparatus of FIGS. 1–3 suitable to the treatment of meat carcasses is shown. A conveyor system 120 has a series of hooks 122 on which the carcasses are hung. The conveyor system carries the carcasses through a spray 124 system similar to a car wash in which the decontaminant solution is sprayed over the carcasses. As shown in FIG. 4, an inverted U-shape supply line 126 carries the decontaminant solution from a reservoir 128 to a variety of spaced nozzles 130, via a pump 132. The nozzles spray the decontaminant fluid over the carcasses. Sprayed decontaminant solution drips from the carcasses and is collected in channels 134 and returned to the reservoir supply or passed to a drain. Optionally, similar spray nozzles 140 spray a rinse fluid, such as sterile water, over the carcasses.

For treating whole animals, the anti-microbial solution (described above) may be applied to the food animal after stunning, but before the animal is bled. In cases where a de-hairing or a de-feathering technology is applied, the application of peracetic acid, preferably occurs after the stunning and after the de-hairing or de feathering processes, but before the animal is bled. Multiple spray nozzles are used in a specialized chamber designed to accommodate the species of food animal which will be treated. The chamber is designed to apply the anti-microbial solution to the entire surface of the animal and may be unique to each species of food animal (i.e., bovine, porcine, ovine, avian).

For animal carcass decontamination, the anti-microbial solution is applied to the food animal carcass after stunning, de-feathering or de-hairing, and when applicable, after the removal of the hide or skin. The application utilizes multiple spray nozzles and, as for whole animal treatment, occurs in a specialized chamber designed to accommodate the species of food animal carcass. Preferably, the carcass is treated at multiple stages of the slaughter process, including pre-evisceration, immediately post-evisceration, and beforeand after the application of other anti-microbial technologies. These may include hot water washes, organic acid rinses (lactic acid, acetic acid or citric acid), steam vacuuming, and steam pasteurization.

The treatment may also be applied to decontaminate heads, organs, offal and other carcass parts. The concentration of the anti-microbial solution, contact time, temperature and other application parameters are controlled to optimize the effectiveness of the treatment.

In an alternative embodiment, the food products or carcasses are dipped into the decontaminant solution in place of being sprayed. The decontaminant solution may be contained in a bath and the food product immersed in the solution for a period of from about five seconds up to about one minute, or more, depending on the concentration of the peracetic acid used. The decontaminated food products may then be rinsed, either by spraying a rinse solution over the food products or by immersing the food products in a rinse solution, such as sterile water.

While not intending to limit the scope of the invention, the following examples show the effectiveness of peracetic acid-based decontaminant solution in the destruction of bacteria, such Listeria, and other microorganisms.

EXAMPLES

Example 1
Peracetic Acid Treatment of Pre-cooked Frankfurters Inoculated with *Listeria Monocytogenes*
Bacterial Cultures and Preparation of Inoculum A five-strain mixture of *Listeria monocytogenes* was used for purposes of inoculation. To prepare this mixture, five strains of *L. monocytogenes* were grown individually in tryptic soy broth (TSB), for 48±2 h at 30° C. Equivalent aliquots of broth from each strain were then combined in a sterile test tube to achieve a mixed inoculum containing approximately equal populations of each of the five strains. The mixed culture was diluted as appropriate using 0.1% peptone diluent to achieve a final mixed inoculum with a cell density of approximately 10,000 colony forming units (cfu)/ml.

Inoculation of Frankfurter Samples

Packages of commercially prepared beef frankfurter sausages ("franks") were obtained from a local retail outlet. TABLE 1 lists the constituents of the franks, as provided on the packages. The packages were stored at 4° C. until use (no more than 24 hours). Immediately prior to testing, the franks were removed from the commercial packaging and placed on a sterile surface in a biological safety cabinet. The franks were oriented on the surface such that no franks were in contact with each other. Using a micropipette, each individual frank (except for those used as controls) was inoculated with 0.1 ml of the previously prepared mixed inoculum with a target inoculation level of 1,000 cfu/frank. A sterile bent rod was used to spread the inoculum over the frank surface as evenly as possible. Inoculated franks were allowed to remain undisturbed on the sterile surface for at least 5 minutes prior to treatment with the decontaminant solution. Three franks were inoculated per treatment to be evaluated, one frank being tested without inoculation.

TABLE 1

Composition of Frankfurters

Oscar Meyer Beef Franks

| | |
|---|---|
| Ingredients: Beef, water, salt, <2% corn syrup, dextrose, flavor beef stock, sodium phosphates, autolyzed yeast, sodium erythorbate (made from sugar), sodium nitrite, extractives of paprika | |
| Nutrition Facts: | per 45 g link |
| Calories | 140 |
| Cal. Fat | 120 |
| Total Fat | 13 g (Sat. 6 g) |
| Cholesterol | 30 mg |
| Sodium | 460 mg |
| Total Carbohydrate | 1 g |
| Protein | 5 g |

Treatment of Frankfurter with Peracetic Acid

The peracetic acid used in the evaluation was obtained as a 35% concentrate under the trade name STERIS 20™ Sterilant Concentrate from STERIS Corporation (Mentor, Ohio). The concentrate was used without the buffers or other additives supplied by the manufacturer. The concentrate was diluted to appropriate nominal concentrations (100, 500, and 1000 ppm). Approximately 1 L of each concentration to be evaluated was prepared in sanitized 2 L, plastic containers. Additionally, 1 L of a control treatment, namely sterile distilled water (0 ppm peracetic acid), was also prepared in a 2 L container. Each of these four concentrations was evaluated using two exposure times, 2 and 10 seconds. Therefore, a total of eight treatments (four peracetic acid concentrations (0, 100, 500, and 1000 ppm) at two exposure times (2 and 10 seconds) were evaluated in this study. Each test was carried out two or more times for establishing reproducibility.

Prior to treatment, one of the three inoculated franks per treatment was evaluated for initial levels of *L. monocytogenes* (target initial population of 1,000 cells per frank). These franks were analyzed using the quantitative procedures outlined below.

All peracetic acid treatments were performed inside a biological safety cabinet. Inoculated franks were dipped into the peracetic acid treatment solution (or distilled water for the 0 ppm samples) and allowed to remain submerged for either 2 or 10 seconds. Sterile utensils were employed to remove the franks from the treatment solution and transfer them to a sterile distilled water rinse. Franks were then submerged in a sterile water rinse and remained submerged for 2 or 10 seconds (i.e., the same time as they were exposed to the peracetic acid solution) and were removed with sterile utensils. Immediately after removal from the sterile water rinse, the franks were placed on a sterile surface and allowed to air dry for 5 minutes.

For each peracetic acid concentration, three franks were evaluated. Separate containers of sterile water rinse were employed for each peracetic acid concentration × exposure time evaluated. All three franks to be treated in a given concentration were dipped into a common peracetic acid solution and a common sterile water rinse.

Following air drying, one frank per treatment was placed in a sterile Stomacher bag and analyzed quantitatively for residual *L. monocytogenes* populations. The remaining two franks were retained in sterile Stomacher bags and used for qualitative analysis, if necessary (in the event no surviving cells were detected using quantitative procedures).

Microbiological Analyses

To determine the number of surviving *L. monocytogenes* cells (quantitative evaluation), one frank per treatment was analyzed. The weight of the frank was determined and an appropriate volume of 0.1% peptone diluent added to achieve a 1:5 dilution. These samples were homogenized for 2 minutes using a Stomacher Lab Blender. Serial dilutions were prepared in 0.1% peptone diluent and appropriate dilutions plated using spiral and/or spread plate Atechniques on MOX agar. Agar plates were incubated at 30° C. for a total of 48 hours, with examination at 24 and 48 hours. Typical *L. monocytogenes* colonies were counted.

Similar evaluation procedures were used for counting the colonies for those franks treated with distilled water rather than peracetic acid, for the untreated franks (no peracetic acid, water or rinse treatment), and for the franks treated with water or peracetic acid without prior inoculation.

The plating techniques used were capable of detection down to 5 cfu/ml (1 colony/0.2 ml) for the spiral plating method and 0.5 cfu/ml for the spread plating method (1 colony/2 ml). In the event that no surviving *L. monocytogenes* cells were observed using direct plating procedures, two franks per treatment were evaluated using qualitative (enrichment) procedures. A 10 mL aliquot of the retained homogenate was placed added to 90 mL of UVM broth to achieve a 1:10 dilution. These samples were shaken by hand for 1 minute and incubated at 30° C. for 24 h. Following this primary enrichment, 0.1 mL was transferred to 10 mL of Fraser broth and incubated at 30° C. for 24 h. This secondary enrichment was then used to perform an ELISA screening procedure (TECRA Listeria species assay). Results of this qualitative analysis were used to indicate whether the sample was "positive" or "negative" for the presence of Listeria species.

Differences in the observed reductions achieved with the various concentrations of peracetic acid were compared among the concentrations as well as compared to the reductions achieved with the sterile water control (0 ppm).

TABLE 2 lists the peracetic acid concentration, temperature, and pH of the solutions used.

TABLE 2

Temperature and pH of peracetic acid treatment solutions immediately prior to use.

| Target PAA Concentration (ppm) | Actual PAA Conc. (ppm) | Exposure Time (sec) | Temperature of PAA Solution (° C.) | pH of PAA Solution |
|---|---|---|---|---|
| Replication 1 | | | | |
| 1,000 | 1,146 | 10 | 12.7 | 3.32 |
| 500 | 572 | 10 | 12.7 | 3.48 |
| 100 | 114 | 10 | 11.6 | 3.86 |
| 0 | 0 | 10 | 14.0 | 5.57 |
| 1,000 | 1,146 | 2 | 11.8 | 3.29 |
| 500 | 572 | 2 | 12.6 | 3.48 |
| 100 | 114 | 2 | 12.0 | 3.86 |
| 0 | 0 | 2 | 13.8 | 6.08 |
| Replication 2 | | | | |
| 1,000 | 1,146 | 10 | 12.1 | 3.27 |
| 500 | 572 | 10 | 11.8 | 3.48 |
| 100 | 114 | 10 | 12.3 | 3.85 |
| 0 | 0 | 10 | 13.6 | 6.17 |
| 1,000 | 1,146 | 2 | 11.9 | 3.29 |
| 500 | 572 | 2 | 11.7 | 3.49 |
| 100 | 114 | 2 | 12.5 | 3.86 |
| 0 | 0 | 2 | 13.5 | 6.18 |
| Replication 3 | | | | |
| 1,000 | 1,146 | 10 | 12.8 | 3.29 |
| 500 | 572 | 10 | 11.8 | 3.49 |
| 100 | 114 | 10 | 12.5 | 3.85 |
| 0 | 0 | 10 | 13.8 | 6.05 |
| 1,000 | 1,146 | 2 | 12.9 | 3.30 |
| 500 | 572 | 2 | 11.6 | 3.50 |
| 100 | 114 | 2 | 11.8 | 3.86 |
| 0 | 0 | 2 | 15.1 | 6.07 |

TABLE 3 shows the quantitative and qualitative microbiological results of analysis of the Listeria-inoculated franks. The target inoculation level before treatment was 1,000 CFU/frank. It can be seen that a 2 second treatment is sufficient to remove most, but not all Listeria from the franks. A 10 second treatment reduces the Listeria count below the detection limit of the quantitative assessment procedures, although a few colonies were detected in the qualitative procedure. The results indicate that some samples had actual populations before treatment of <900 CFU/frank. Because the plating scheme had a detection limit of 900 CPU/frank, the actual populations of the samples before treatment could not be determined in instances where the population was <900 CFU/frank. Additionally, the plating scheme used for samples analyzed after treatment had a detection limit of 90 CFU/frank. Therefore, the true population of any samples with a population of <90 CFU/frank could not be specifically determined. For any samples that had a population of <90 CFU/frank after treatment, the retained homogenate was analyzed using qualitative (presence/absence) procedures. Positive indicates that at least one colony grew during the test. Negative indicated that no colonies grew.

At the 0 ppm PAA concentration, all samples after treatment had a population of at least 90 CFU/frank, regardless of exposure time (2 or 10 seconds). At the 100 ppm PAA concentration, regardless of exposure time, in two of the three replications samples had populations of at least 90 CFU/frank.

For a 10 second exposure time, samples treated in the 500 ppm PAA solution had *L. monocytogenes* populations less than the detection limit of the quantitative plating procedure, however in two of the three replications samples were found to be positive by qualitative analysis. At the 2 second exposure time, samples treated in the 500 ppm PAA solution had populations of <90 CFU/frank in two of the three replications, however these samples were found to be positive by qualitative analysis.

The 1000 ppm PAA solution, regardless of exposure time, resulted in populations of <90 CFU/frank in all three replications. For both exposure times, two of the three samples analyzed by qualitative analysis were found to be positive for the presence of Listeria.

TABLE 3

Quantitative and qualitative microbiological data obtained from analysis of *Listeria monocytogenes*-inoculated frankfurters before and after treatment with solutions of peracetic acid with exposure times of 10 seconds or 2 seconds.

| PAA Concentration | | | Before | After treatment | |
|---|---|---|---|---|---|
| Estimated Conc.-ppm | Actual Conc.-ppm | | Treatment (CFU/frank) | (CFU/ frank) | POS/ NEG |
| 10 sec PAA exposure followed by 10 sec deionized water rinse | | | | | |
| 0 | 0 | Rep 1 | 900 | 90 | — |
| | | Rep 2 | 2,700 | 180 | — |
| | | Rep 3 | <900* | 90 | — |
| 100 | 114 | Rep 1 | <900* | <90* | POS |
| | | Rep 2 | 1,800 | 180 | — |
| | | Rep 3 | <900* | 180 | — |
| 500 | 572 | Rep 1 | 900 | <90* | POS |
| | | Rep 2 | 2,700 | <90* | POS |
| | | Rep 3 | 1,800 | <90* | NEG |
| 1000 | 1146 | Rep 1 | <900* | <90* | NEG |
| | | Rep 2 | 900 | <90* | POS |
| | | Rep 3 | 900 | <90* | POS |
| 2 sec PAA exposure followed by 2 sec deionized water rinse | | | | | |
| 0 | 0 | Rep 1 | <900* | 180 | — |
| | | Rep 2 | <900* | 180 | — |
| | | Rep 3 | <900* | 90 | — |
| 100 | 114 | Rep 1 | <900* | 180 | — |
| | | Rep 2 | 900 | <90* | POS |
| | | Rep 3 | 1,800 | 90 | — |
| 500 | 572 | Rep 1 | 900 | <90* | POS |
| | | Rep 2 | <900* | <90* | POS |
| | | Rep 3 | <900* | 90 | — |
| 1000 | 1146 | Rep 1 | 900 | <90* | NEG |
| | | Rep 2 | 1,800 | <90* | POS |
| | | Rep 3 | <900* | <90* | POS |

*Indicates that for quantitative analysis, no colonies were observed on the lowest dilution plated. Therefore, the population was less than the detection limit of the plating scheme. The detection limit for samples plated before treatment was 900 CFU/frank; the detection limit for samples plated after treatment was 90 CFU/frank.
—Indicates that the sample was not analyzed using qualitative procedures.

The results show that it is possible to remove substantially all Listeria from a frankfurter in ten seconds dip treatment.

It should be appreciated that the frankfurters tested were inoculated with massive amounts of Listeria, relative to what would be expected in practice, demonstrating the ability of peracetic acid to decrease Listeria contamination by orders of magnitude.

Further tests using 2000 ppm sprayed over the frankfurters for 30 seconds to one minute showed even higher kill levels, with complete kill being achieved.

Example 2
D-Values for *Listeria monocytogenes* in Peracetic Acid Solutions

Peracetic acid solutions of 500, 1000, and 2000 mg/L (ppm) were prepared as for Example 1, using deionized water. To 100 mL samples of the solutions, $1.7 \times 10^6$ *Listeria monocytogenes* ATCC. 43256 per mL were added and mixed. The samples were maintained at a preselected temperature (° C. ° C., ~15° C., or ~22° C.). At 10, 20, 30, 40, and 50 seconds contact time, 1 mL was removed, neutralized, and the *Listeria monocytogenes* organisms remaining were determined by plating on TSA and incubation. Results showed that the microorganism was destroyed in all cases, except for the sample exposed to 500 mg/L at ~8° C. for only 10 seconds. D-values (time required to kill one log of the test microorganism—in this case, a reduction in microorganisms from $1.7 \times 10^6$ initially to $1.7 \times 10^5$) were determined, as shown in TABLE 4. D-values below the detection limit of the test are shown as <2 seconds.

TABLE 4

D-values for *Listeria monocytogenes*

| Peracetic acid concentration (mg/L) | Temperature Range (° C.) | pH range | D-value (seconds) |
| --- | --- | --- | --- |
| 500 | 8.3–8.5 | 3.7–3.7 | 2 |
| 500 | 14.7–15.0 | 3.4–3.6 | <2 |
| 500 | 22.7–22.8 | 3.4–3.6 | <2 |
| 1000 | 8.1–8.1 | 3.2–3.4 | <2 |
| 1000 | 15.0–15.2 | 3.2–3.4 | <2 |
| 2000 | 8.1–8.4 | 3.0–3.1 | <2 |
| 2000 | 3.0–3.1 | 3.0–3.1 | <2 |

Example 3
Stability of Peracetic Acid Solutions

Peracetic acid solutions were prepared in deionized water as for Example 2 to nominal concentrations of 1000 and 2000 mg/L. Actual peracetic acid concentrations were measured at 0 and 30 minutes at around 25° C. and 50° C. Results shown in TABLE 5 indicate that the solutions remained relatively stable over the 30 minute period.

TABLE 5

Stability of peracetic acid solutions at 25 and 50° C. over 30 minutes

| Temperature (° C.) | pH | Concentration at 0 mins (mg/L) | Concentration at 30 mins (mg/L) |
| --- | --- | --- | --- |
| 26–29 | 2.7 | 1347 | 1355 |
| 50 | 2.7 | 1310 | 1284 |
| 26–29 | 2.6 | 2016 | 2017 |
| 50 | 2.6 | 1937 | 1959 |

Example 4
Minimum Inhibitory Concentration of Acetic Acid, Lactic Acid, Acetic Acid, and Liquid Smoke on Generic *Ascherichia Coli* and *Salmonella spp*

The minimum inhibitory concentration (MIC) was determined for five strains of *E. coli* and five strains of Salmonella spp. as listed in TABLE 6, using acetic acid, lactic acid, peracetic acid, and liquid smoke.

TABLE 6

Strains of *E. coli* and Salmonella used in MIC Studies

| Microorganism | Strain |
| --- | --- |
| *E. coli* | ATCC. 4350 |
| *E. coli* | ATCC 35336 |
| *E. coli* | ATCC 9546 |
| *E. coli* | ATCC 12043 |
| *E. coli* | ATCC 25922 |
| *Salmonella enteritidis* | USDA-FSIS 15060 |
| *Salmonella newport* | ATCC 6962 |
| *Salmonella typhimurium* | Dr. S. Bailey, USDA-ARS, Athens, GA |
| Salmonellalille | Dr. L. Beuchat, University of Georgia, Griffin, GA |
| *Salmonella montevideo* | Dr. L. Beuchat, University of Georgia, Griffin, GA |

Each strain was subcultured on tryptic soy agar (TSA, DIFCO, Detroit, Mich.) slants and stored at 4° C. Strains were individually transferred into 100 mL of sterile 2× BHI (DIFCO, Detroit, Mich.) and incubated at 35° C. for 24 hr. to reach ca. $10^9$ colony forming units/mL (CFU/mL). Then, 25 mL of each strain of *E. coli* was transferred into a sterile bottle (mixture X), and 25 mL of each strain of each strain of Salmonella spp. was transferred into a sterile bottle (mixture Y). Mixtures X and Y were maintained separately throughout the test.

The average initial inoculum levels of *E. coli* and Salmonella spp. were ca. $1.0 \times 10^9$ CFU/mL, and ca. $8.4 \times 10^9$ CFU/mL, respectively.

Serial dilutions were made using Butterfields' Phosphate Buffer (BPB, Sigma, St. Louis, Mo.) in 1 mL aliquots prior to inoculation. BPB was prepared as a stock solution by adding 34 g Of $KH_2PO_4$ to 500 mL of distilled water. The pH was adjusted to 7.2, and the solution was brought to a volume of 1 L. The BPB stock was autoclaved for 20 min. at 121° C. and 15 lbs. of pressure. For each of the treatments to be evaluated, (acetic acid, lactic acid, peracetic acid, and liquid, smoke) a 10 mL test tube containing 1 mL of buffer, 1 mL of treatment, and 1 mL of mixture X or Y. was prepared. For glacial acetic acid (U.S.P.-F.C.C., J. T. Baker, Phillipsburg, N.J.), starting concentrations and serial dilutions were 50%, 25%, 12.5%, 6.25%, 3.12%, 1.56%, 0.78%, 0.39%, and a control (no treatment, buffer and culture). For lactic acid, 86.30% (U.S.P.-F.C.C., J. T. Baker, Phillipsburg, N.J.), starting concentrations and serial dilutions were 43.15%, 21.58%, 10.79%, 5.39%, 2.70%, 1.35%, 0.67%, 0.33%, and a control. For peracetic acid 35.0% (STERIS 20™, STERIS Corporation, Mentor, Ohio), starting concentrations and serial dilutions were 17.5%, 8.75%, 4.38%, 2.19%, 1.09%, 0.55%, 0.30%, 0.14%, 0.07%, 0.03%, and a control. For liquid smoke (Hickory Specialties, Brentwood, Tenn.) starting concentrations and serial dilutions were 50%, 25%, 12.5%, 6.25%, 3.12%, 1.56%, 0.78%, 0.39%, and a control. Dilutions were prepared with deionized water.

The test tubes were incubated at 35° C. for 24 hrs. and turbidity was evaluated using McFarland equivalence standards, to study the bacteriostatic properties of the diluted solutions. In addition, each dilution was plated to evaluate the bactericidal properties of, the diluted solutions. Using a 1 µL sterile loop, each concentration and control for either microorganism mixture was streaked on plate count agar (PCA, DIFCO, Detroit, Mich.). A selective agar was also used for each mixture, eosine methylene blue agar (EMB, DIFCO, Detroit, Mich.) for *E. coli* and xylose lysine decarboxylase agar (XLD, DIFCO, Detroit,Mich.) for Salmonella spp. All plates were incubated for 24 hrs. at 35° C. and were inspected for growth or no growth.

All four treatments were effective in inhibiting the growth of generic *E. coli* and Salmonella spp. at different levels in laboratory medium. A summary of the treatments, microorganisms, and final minimum inhibitory concentration (MIC) can be found in TABLE 7. Peracetic acid inhibited the growth of *E. coli* and Salmonella spp. at the lowest concentration (0.137%) of all three acids tested.

TABLE 7

Minimum inhibitory concentrations of liquid smoke, acetic acid, lactic acid, and peracetic acid for *E. coli* and Salmonella spp.

| | Treatment | | | |
|---|---|---|---|---|
| | MIC (%) | | | |
| Organism | Liquid Smoke | Acetic Acid | Lactic acid | Peracetic acid |
| *E. coli* | 6.25 | 3.12 | 2.70 | 0.14 |
| Salmonella spp. | 6.25 | 0.78 | 1.35 | 0.14 |

Example 5

Reduction of Generic *Escherichia coli* and Salmonella spp. on Pork Skin with Water, Acetic Acid, Lactic Acid, or Peracetic Acid Samples of pork skin were inoculated separately with either 5 strains of *E. coli* or 5 strains of Salmonella spp. (mixtures X and Y, see Example 4). Five different treatments were evaluated for effectiveness in reducing bacteria on pork skin. The treatments, were deionized water, 2% acetic acid, 2% lactic acid, 0.1% peracetic acid, and a control (no treatment), respectively. EMB agar was used for *E. coli* and XLD for Salmonella, and a nutrient agar was also used for *E. coli* and Salmonella for total count.

Bacterial Cultures

The five strains of generic *E. coli* and five strains of Salmonella spp. were cultured and transferred individually into 100 mL of tryptic soy broth (TSB, DIFCO, Detroit, Mich.) with 1% dextrose (Sigma, St. Louis, Mo.) in duplicate. Dextrose was added to induce acid tolerance in the microbial cell. The cultures were incubated at 35° C. for 24 hrs. to obtain ca. $10^9$ colony forming units (CFU)/mL. The cells were harvested by the centrifuging each culture at 10,000 Xg force for 10 min. at 4° C., (Beckman J2-HS centrifuge, Beckman Instruments, Inc., Palo Alto, Calif.). After centrifugation, the supernatant was poured off, and cells remained in pellet form. Each pellet was individually re-suspended with 50 mL of 0.1% peptonewater (DIFCO, Detroit, Mich.). All five strains of *E. coli* or Salmonella spp. inoculum were transferred to separate HDPE plastic spray bottles (Sprayco™, Detroit, Mich.) to be used in the mist inoculation of pork skin samples.

Media

For *E. coli,* PCA and EMB media were used, and for Salmonella, PCA and XLD media were used. Bacto Plate Count Agar (PCA) was used in this study as a standard methods medium for the enumeration of bacteria before and after treatments. Spiral (sl), or spread (sd) plate technique were used for viable cell counts. Duplicate plates were performed for each treatment.

Pork Sample Preparation

Fresh pork skins taken from the loin region were cut to rectangles of 19.35 cm². A hole was bored into the top of each sample so that each sample could be suspended from an individual hook in the spray cabinet. Samples were laid out onto trays wrapped in butcher paper. Each tray was individually spray inoculated with *E. coli* or Salmonella spp. in a Plexiglas spray chamber to ca. 8.4 mL of inoculum. After the inoculation, each tray was placed under a laminar flow hood for 1 hr. to allow the surface to dry and for the attachment of the bacteria to the pork skin.

The peracetic acid (PAA) used in this study was a 35.0% PAA buffered, liquid solution prepared from a STERIS 20™ two compartment cup (a dry powder containing anticorrosive additives, buffers, sequestrants, and surfactants). The peracetic acid determined before each use of the treatment using a calibration curve.

Treatment Application

Five inoculated samples were individually placed on stainless steel hooks in. a spray cabinet at ambient temperature.

The samples were exposed to a continuous spray of the selected treatment for 5 seconds at a spray pressure of 16–18 psi.

The treated samples were placed into individual stomacher bags containing 30 mL of 0.1% peptone water (DIFCO, Detroit, Mich.) and stomached for 2 min. Serial dilutions of 0, $10^{-2}$, and $10^{-4}$ were spiral plated (WASP spiral plater, Bioscience International, Rockville, Md.) on PCA (DIFCO, Detroit, Mich.) and EMB (DIFCO, Detroit, Mich.) for *E. coli* and on plate count agar (PCA, DIFCO, Detroit, Mich.) and xylose lysine decarboxylase agar (XLD, DIFCO, Detroit, Mich.) for Salmonella spp. Samples were also spread plated on PCA and EMB agar for *E. coli* or PCA and XLD agar for Salmonella spp, using 0.25 μL/plate for a total of 1 mL on 4 plates. This was to ensure a countable plate. Plates were inverted and incubated at 35° C. for 24 hrs. (48 hrs. for Salmonella spp.).

Titratable Acidity And pH

Titratable acidity (TABLE 8) was determined according to AOAC methods (JAOAC 30, 130: 1947;34,239: 1951), using a 1/10 dilution factor. Phenylethylene was used as the indicator with 0.1N NaOH as the base. The pH of acetic and lactic acid was determined during each replication using a standardized pH meter (Orion Research, Inc., Beverly, Mass.).

TABLE 8

Average titratable acidity and pH values for acetic and lactic acid used on *Escherichia coli* and Salmonella spp.

| Treatment | Microorganism | Titratable Acidity (mL) | pH |
|---|---|---|---|
| Acetic acid | *E. coli* | 2.65 | 2.54 |
| Acetic acid | Salmonella spp. | 2.45 | 2.55 |
| Lactic acid | *E. coli* | 2.07 | 2.10 |
| Lactic acid | Salmonella spp. | 1.93 | 2.08 |

Microorganism Count

Microorganism counts on the different agar plates are provided in TABLE 9.

TABLE 9

Log CFU/cm² of *Eschericia Coli* and Salmonella spp. on inoculated pork skins after 24 hours (*E. coli*)/48 hours (Salmonella)

| Treatment | Total Count (*E. coli*) on PCA | Total Count (*E. coli*) on EMB | Total Count (Salmonella) on PCA | Total Count (Salmonella) on XLD |
|---|---|---|---|---|
| No treatment | 6.55 | 6.54 | 6.46 | 5.72 |
| Water | 5.25 | 5.15 | 6.05 | 5.78 |

TABLE 9-continued

Log CFU/cm² of *Eschericia Coli* and Salmonella spp. on inoculated pork skins after 24 hours (*E. coli*)/48 hours (Salmonella)

| Treatment | Total Count (*E. coli*) on PCA | Total Count (*E. coli*) on EMB | Total Count (Salmonella) on PCA | Total Count (Salmonella) on XLD |
|---|---|---|---|---|
| 2% Lactic acid | 3.96 | 4.02 | 4.95 | 2.97 |
| 0.1% Peracetic Acid | 3.28 | 3.04 | 5.34 | 3.83 |
| 2% Acetic Acid | 4.68 | 4.55 | 5.37 | 4.27 |

Peracetic acid (0.1%) (PAA) can be seen to be an effective rinsing agent for Salmonella and *E. coli,* even though used at much lower concentration than the lactic acid or acetic acid. Acetic acid, lactic acid, and peracetic acid were all found to be effective in inhibiting the growth of *E. coli* and Salmonella spp. at lower concentrations than for liquid smoke. As seen from TABLE 7, the minimum inhibitory concentration (MIC) using the test tube dilution method indicated that the most effective antimicrobial for generic *E. coli* and Salmonella spp. was peracetic acid. Liquid smoke had the highest MIC of 6.25% for *E. coli* and Salmonella spp. compared to the organic acids.

Peracetic acid (0.1%) was the most effective treatment on pork skin for *E. coli,* achieving 3 log/cm² reduction and was significantly ($p \leq 0.05$) different from all other treatments. Lactic acid (2%) was the most effective treatment for Salmonella spp., achieving almost 3 log/cm² reduction. After 24 hrs. Salmonella spp. showed little to no recovery; therefore, an additional 24 hrs. incubation period was evaluated. This suggested that the Salmonella spp. were more susceptible to acid injury compared to *E. coli* cells. The selective agars used suggested higher reductions than the nutrient agar.

The studies suggest that decontamination rinses are effective in reducing the amount of bacteria in laboratory media and on pork skin.

Statistical Analysis

Bacterial enumeration data from the three replications of *E. coli* and Salmonella spp. were analyzed by the analysis of variance using the General Linear Model procedure of Statistical Analysis System (SAS Institute, Inc., 1990). LSD was used to separate the means of the log CFU/cm² samples.

For generic *E. coli,* all treatments were significantly different ($p \leq 0.05$) on both PCA and EMB. For Salmonella spp. on PCA, there were no significant differences (>0.05) between the samples that were treated with water (W) and the samples that were untreated (NT). Acetic acid (AC) showed no significant difference ($p > 0.05$) from lactic acid (LA), or peracetic acid (PAA), indicating that the organic acids were reducing Salmonella spp. to approximately the same level. For Salmonella spp. on XLD, there were significant differences ($p \leq 0.05$) between the untreated samples (NT) and the samples treated with water (W). Acetic acid (AC) and peracetic acid (PAA) were not. significantly different ($p > 0.05$). The lactic acid (LA) treatment was significantly different ($p \leq 0.05$) from all other treatments.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of treating a food product comprising sausages, the method comprising:

cooking the sausages in casings;

removing the sausages from casings;

contacting an exterior of the decased sausages with a decontaminant solution containing an antimicrobial agent which includes peracetic acid for a sufficient time to microbially decontaminate the exterior of the decased sausages.

2. The method of claim 1, further including:

rinsing the microbially decontaminated decased sausages to remove the decontaminant solution.

3. The method of claim 1, further including:

sterile drying the decontaminated decased sausages.

4. The method of claim 3, further including, after the step of drying the food product:

aseptically packaging the food product.

5. The method of claim 1, wherein the peracetic acid in the decontaminant solution is at a concentration of from about 100 to about 4000 ppm.

6. The method of claim 1, wherein the step of contacting the food product with the decontaminant solution includes spraying the decontaminant solution over the decased sausages.

7. The method of claim 6, wherein the food product is sprayed with the decontaminant solution for a period of from about 10 seconds to 5 minutes.

8. The method of claim 7, wherein the food product is sprayed with the decontaminant solution for a period of from about 1 to 2 minutes.

9. The method of claim 6, wherein the step of contacting the food product with the decontaminant solution includes transporting the food product on a conveyor past spray nozzles which spray the decontaminant solution over the food product.

10. The method of claim 6, further including:

recirculating the sprayed decontaminant solution.

* * * * *